United States Patent [19]
Chisnell et al.

[11] Patent Number: 5,096,231
[45] Date of Patent: Mar. 17, 1992

[54] FLEXIBLE FLUID CONDUIT ASSEMBLY

[75] Inventors: Jerry H. Chisnell, Northville, Mich.; Edwin W. MacWilliam, Deltona, Fla.

[73] Assignee: S&H Fabricating and Engineering Inc., Lake Mary, Fla.

[21] Appl. No.: 619,233

[22] Filed: Nov. 28, 1990

[51] Int. Cl.⁵ ............................................. F16L 9/14
[52] U.S. Cl. ..................................... 285/55; 285/256; 285/918
[58] Field of Search ............... 285/55, 256, 259, 149, 285/918

[56] References Cited

U.S. PATENT DOCUMENTS

| | | | |
|---|---|---|---|
| 1,825,005 | 9/1931 | Loughead | 285/256 |
| 2,008,650 | 7/1935 | Weatherhead, Jr. | 285/55 X |
| 2,453,997 | 1/1948 | MacWilliam | 285/84 |
| 2,572,645 | 10/1951 | Melsom | 285/84 |
| 2,797,111 | 6/1957 | Beazley | 285/149 |
| 3,073,628 | 1/1963 | Cline et al. | 285/259 X |
| 3,224,794 | 12/1965 | Crissy | 285/259 X |
| 3,578,360 | 5/1971 | Eliot | 285/55 |
| 3,794,360 | 2/1974 | Bachle et al. | 285/256 |
| 3,915,480 | 10/1975 | Kish et al. | 285/174 |
| 3,990,729 | 1/1976 | Szentmihaly | 285/109 |
| 4,005,880 | 2/1977 | Anderson et al. | 285/47 |
| 4,039,212 | 8/1977 | Skarud | 285/253 |
| 4,106,526 | 8/1978 | Szentmihaly | 138/109 |
| 4,111,469 | 9/1978 | Kavick | 285/286 |
| 4,114,656 | 9/1978 | Kish | 138/109 |
| 4,142,554 | 3/1979 | Washkewicz et al. | 138/109 |
| 4,226,446 | 10/1980 | Burrington | 285/256 |
| 4,305,608 | 12/1981 | Stuemky et al. | 285/256 |
| 4,369,992 | 1/1983 | Fournier et al. | 285/256 |
| 4,392,678 | 6/1983 | Adamczyk | 285/256 |
| 4,478,435 | 10/1984 | Cheshier et al. | 285/39 |
| 4,522,435 | 6/1985 | Miller et al. | 285/256 |
| 4,593,942 | 6/1986 | Loker | 285/253 |
| 4,729,583 | 3/1988 | Lalikos et al. | 285/149 |

FOREIGN PATENT DOCUMENTS

| | | |
|---|---|---|
| 1164770 | 3/1964 | Fed. Rep. of Germany . |
| 2430665 | 1/1976 | Fed. Rep. of Germany . |
| 2506874 | 8/1976 | Fed. Rep. of Germany . |
| 1083741 | 9/1967 | United Kingdom . |

OTHER PUBLICATIONS

Drawing No. ES 0010; 02/06/79; S & H Fabricating and Engineering, INC.; 1 Page.
Drawing No. C517-12-IM; 05/24/89; S & H Fabricating and Engineering, Inc.; 1 Page.
Drawing No. C-12-4M,; 09/12/83; S & H Fabricating and Engineering, Inc.; 1 Page.
Drawing No. ES-0223; 06/13/88; S & H Fabricating and Engineering, Inc.; 1 Page.
Drawing No. ES-0110-GG; 11/04/86; S & H Fabricating and Engineering Inc.; 1 Page.

Primary Examiner—Dave W. Arola
Assistant Examiner—Heather Chun
Attorney, Agent, or Firm—Brooks & Kushman

[57] ABSTRACT

An improved hose fitting assembly is disclosed which is designed for use in automotive air conditioning systems and is particularly well suited for use in such systems employing recently developed composite type hose which incorporates an inner liner of a thermoplastic material such as nylon or the like. The assembly comprises a resilient sealing member provided on the outer periphery of the fitting which is designed to sealingly engage the hose member and fitting to provide a positive seal therebetween so as to prevent loss of pressurized fluid such as refrigerant gas.

4 Claims, 1 Drawing Sheet

FLEXIBLE FLUID CONDUIT ASSEMBLY

TECHNICAL FIELD

The present invention relates generally to hose fitting assemblies and more particularly to such assemblies which are designed for use in high pressure fluid conducting systems such as automotive air conditioning systems.

BACKGROUND ART

Reinforced flexible hose has long been in use in interconnecting various components of automotive air conditioning systems. Typically, these hoses have been provided with fittings which include a ribbed end portion insertable within the end of the flexible hose and a sleeve surrounding the end portion of the hose which is radially compressed or crimped to clamp the hose between the sleeve and end fitting. In order to increase the mechanical strength of the joint as well as to increase the sealing capability thereof, a plurality of annular ribs are often provided on the fitting.

However, recently a composite type reinforced hose material has been developed which offers significant advantages over previous types of reinforced hose constructions in terms of both cost and weight. It should also be noted that this hose construction is also advantageous in that it has a significantly lower permeability to freon gas commonly utilized in automotive air conditioning systems. This composite hose includes an inner liner fabricated from a thermoplastic material which is characterized by its low memory characteristics and low resistance to compression setting. While this hose construction is less costly to manufacture and is lighter in weight, the presence of the liner material renders previous methods of forming fluid-tight seals with fittings relatively unacceptable due to the poor resistance to compression set of the liner material which increases the tendency for leakage to occur. That is to say that when presently known methods are employed to secure end fittings to such composite type hose, the compressive forces created by the crimped sleeve are relieved or reduced because the liner material tends to flow away from areas of maximum compression thereby reducing the sealing effect resulting from the compressive loading exerted thereon. This tendency of such thermoplastic materials to flow increases at elevated temperatures such as may be encountered by such hose assemblies employed in automotive air conditioning due to their location proximate the engine as well as from the heat of compression to which they may be subjected.

The present invention, however, has overcome these problems by providing a separate resilient sealing member positioned between the liner material and male end of the fitting which operates to create a durable and reliable seal therebetween. A sleeve member is provided which clamps the hose and liner against the male end of the fitting, however, because of the presence of the separate sealing member, the loads required to set or crimp the sleeve are substantially reduced thereby facilitating both shop fabrication of the assemblies as well as subsequent repair and/or replacement of the end fittings if required. Thus, the present invention provides an extremely economical and efficient means by which the advantages offered by this new composite hose material may be realized in high pressure fluid environments such as automotive air conditioning systems. Additionally, the present invention is also well suited for use in conjunction with economically securing fittings to the ends of other types of tubes and fluid conduits exhibiting these low memory and low resistance to compression set characteristics.

Additional advantages and features of the present invention will become apparent from the subsequent description and the appended claims taken in conjunction with the accompanying drawings.

BEST MODE FOR CARRYING OUT THE INVENTION

Figure 1:
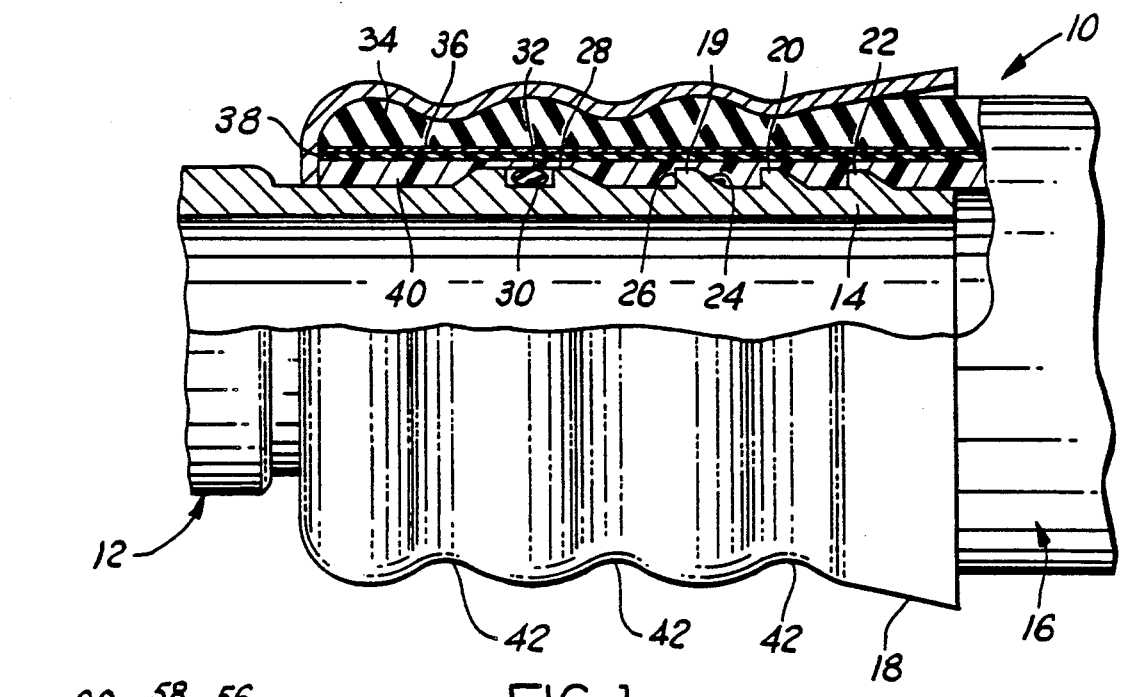
FIG. 1 is a side view of a hose connection assembly in accordance with the present invention shown partially in section.

Referring now to the drawings and in particular to FIG. 1, there is shown an improved hose connection assembly in accordance with the present invention being indicated generally at 10. Hose construction assembly 10 includes a fitting 12 one end 14 of which is received within an end section of a hose 16 and secured therein by means of a crimped sleeve 18.

Fitting 12, only an end portion of which is shown, comprises an elongated generally cylindrical body portion having a plurality of spaced annular radially outwardly extending buttress type ribs 19,20,22 provided on the outer surface thereof adjacent one end. Preferably, each of the ribs will be defined by a radially outwardly inclined wall 24 on the axially outer side and an axially inwardly facing wall 26 extending generally perpendicularly to the longitudinal axis of fitting 12. An increased diameter portion 28 is provided disposed axially inwardly from rib 19 within which is formed an annular groove 30 which is adapted to receive and retain in position suitable resilient sealing means preferably in the form of an O-ring 32. As shown, groove 30 preferably has a width relative to the cross-sectional diameter of O-ring 32 so as to provide a slight clearance therebetween upon assembly of the fitting. The other end portion of fitting 12 will be of conventional construction and may include for example an elongated hexagonal shaped portion suitable for engagement by a wrench followed by a plurality of stepped shoulders and a threaded portion adapted to sealingly mate with another portion of the automotive air conditioning system or such other structure desired to effect a connection with other portions of the system in which the assembly is to be utilized. It should be noted that while as shown groove 30 is formed in an enlarged diameter portion of fitting 12, it may in some applications be desirable to delete this increased diameter portion and machine groove 30 directly in the cylindrical wall portion of fitting 12.

Hose 16, as shown, is of the newly developed composite reinforced type and includes an outer layer 34 typically of a suitable synthetic rubber material with a layer of suitable reinforcing material such as a braided fiber material 36 disposed between the inner surface thereof and another layer 38 of synthetic rubber material. An inner liner 40 is also provided which is fabricated from a suitable thermoplastic material such as for example nylon, teflon, polyethylene or other similar material. It is the presence of this liner material which both affords the aforementioned advantages to this type of hose construction and also gives rise to the problems mentioned in effecting a long lasting, durable and economical fluid-tight seal.

In order to secure hose 16 to fitting 12, a deformable cylindrical sleeve member 18 is provided surrounding the end portion of hose 16 which is adapted to be swaged, crimped or otherwise radially inwardly compressed at a plurality of axially spaced locations 42 therealong so as to clamp hose 16 between fitting 12 and compressed sleeve member 18. This compressive force will operate to compress the radially inner and outer surfaces of O-ring 32 slightly thereby forming a fluid-tight secure seal between O-ring 32 and liner 40 and fitting 12. It should also be noted that groove 30 will preferably be located along the length of end portion 14 of fitting 12 so as to position O-ring 32 approximately midway between crimps 42 so as to avoid excessive compression force thereon.

In order to assemble the present invention, it is first necessary to expand the O-ring 32 and position it within groove 32. Thereafter, end portion of hose 16 is expanded and end fitting 12 along with O-ring 32 seated thereon is inserted within the thus expanded end portion. It should be noted that preferably the inside diameter of composite hose 16 will be slightly less than the outside diameter of end fitting 14 and thus liner 40 will be placed in tension when hose 16 is assembled to fitting 12. Next, sleeve member 18 is positioned in overlying relationship to the portion of hose 16 within which end fitting 12 is received and is thereafter deformed at a plurality of locations so as to effect a secure mechanically strong fluid-tight sealing relationship therebetween. Because of the presence of resilient sealing member 32, the amount of compressive loading required may be reduced without sacrificing any seal integrity thereby facilitating assembly of the hose and end fitting. Further, this reduced compressive loading in fact actually results prolonging the life of the seal thus created. The presence of the resilient sealing member which is under compressive loading between the liner 40 and end fitting 12 will operate to offset any effects resulting from the flowing of the liner material thus insuring a durable, long lasting, fluid-tight seal.

Figure 3:
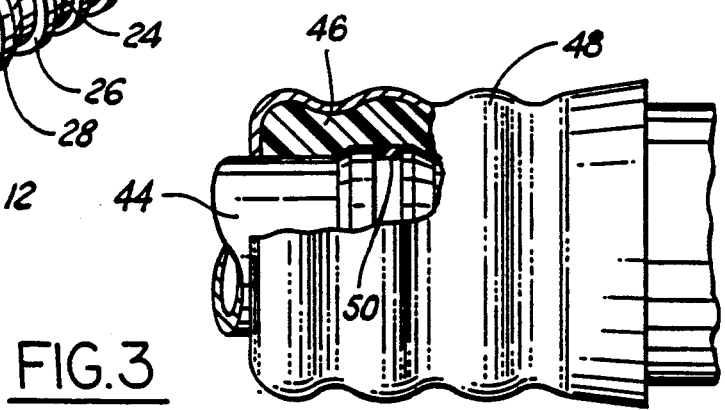
FIG. 3 is a view similar to that of FIG. 1 but showing an alternative embodiment of the present invention.

As previously mentioned, the present invention is also well suited for use not only with composite type reinforced hose as described above, but also in providing a fluid-tight seal between end fittings and other types of tubing which may be fabricated entirely from such thermoplastic material. Such an embodiment is illustrated in FIG. 3 wherein a fitting 44 is secured to tube 46 by means of a crimped sleeve 48 with a resilient sealing member 50 in the form of an O-ring compressed between fitting 44 and the inside diameter of tube 46.

Figure 4:
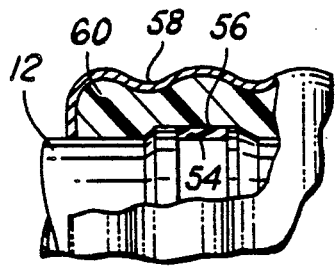
FIG. 4 is a view similar to that of FIG. 3 but showing another embodiment of the present invention.
Figure 2:
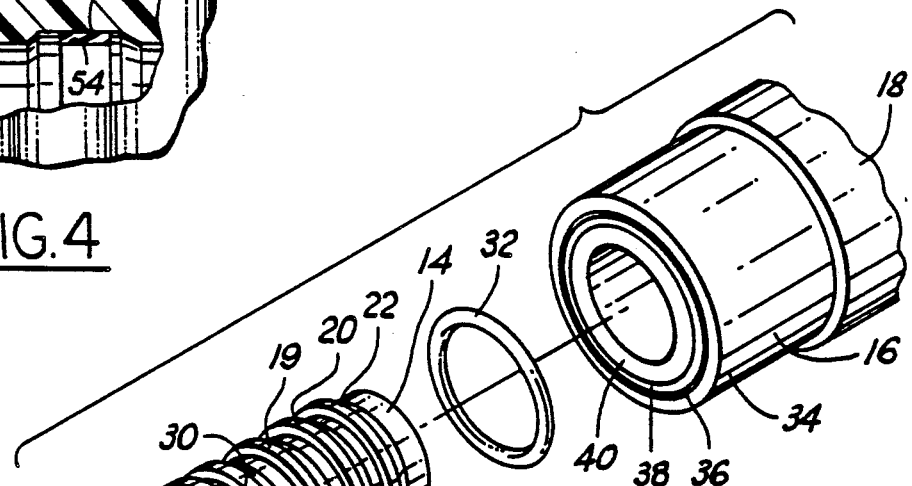
FIG. 2 is an exploded perspective view of the hose assembly of FIG. 1.

It should also be noted that while it is believed preferably to use an O-ring as the resilient sealing member, in some applications it may be desirable to utilize an axially elongated sealing member in place thereof. Such an embodiment is illustrated in FIG. 4 wherein fitting 52 is provided with an annular groove 54 of substantial axial dimensions. In this embodiment, a sealing member 56 having a generally rectangular cross-sectional shape is provided seated within and substantially filling groove 54. A sleeve 58 is also provided overlying and compressing hose 60 against sealing member 56 and fitting 52 in a like manner as described below.

While the best mode for carrying out the invention has been described in detail, those familiar with the art to which this invention relates will recognize various alternative designs and embodiments for practicing the invention as defined by the following claims.

What is claimed is:

1. An improved hose assembly for a motor vehicle air conditioning system comprising:
    a flexible composite reinforced hose including an inner liner fabricated from a thermoplastic material characterized by a low memory and low resistance to compression setting;
    an end fitting having a portion received within one end of said liner and an annular groove provided on the outer surface of said portion;
    said liner having an inside diameter slightly less than the outside diameter of said fitting to thereby place said liner in tension when the fitting is received therewithin;
    a resilient sealing member seated within said groove and engaging the inner surface of said liner, said sealing means being fabricated from a material having resistance to compression setting substantially greater than that of said liner;
    a deformable sleeve member surrounding the outer surface of said hose, said sleeve being radially inwardly crimped at a plurality of axially spaced locations so as to exert a clamping force on said hose to thereby secure said fitting therein, said sealing means being axially located between said deformed locations and operative to create a fluid-tight seal between said fitting and said liner;
    the width of said annular groove being greater than the cross-section of said sealing member to thereby provide a clearance between the sealing member and said groove as assembled after said crimping;
    said sealing means providing a primary seal between said hose and said fitting; and
    said fitting further including a plurality of axially spaced ribs located between said primary seal and the inward most end of said fitting within said liner, said axially spaced ribs being embedded within said liner, thereby forming a secondary seal between said hose and said fitting and cooperating with said sleeve to securely retain said fitting within said hose.

2. A hose assembly as set forth in claim 1 wherein said inner liner is polytetrafluoroethylene.

3. A fluid conduit assembly as set forth in claim 1 wherein said sealing means is in the form of an O-ring.

4. A fluid conduit assembly as set forth in claim 1 wherein said sealing means comprises an axially elongated ring shaped member.

* * * * *